United States Patent Office 3,720,592
Patented Mar. 13, 1973

3,720,592
VINYL ESTER RESINS CURED BY IONIZING RADIATION IN THE PRESENCE OF CBr₄
Inder Mani, Midland, Mich., assignor to The Dow Chemical Company, Midland, Mich.
No Drawing. Filed Mar. 12, 1971, Ser. No. 123,913
Int. Cl. C08g 45/04
U.S. Cl. 204—159.15
18 Claims

ABSTRACT OF THE DISCLOSURE

The addition of at least about 0.1 weight percent of carbon tetrabromide to a thermosettable mixture of certain vinyl monomers and polymerizable vinyl ester resins reduces the dosage level of ionizing radiation required to cure the mixture.

BACKGROUND OF THE INVENTION

This invention relates to the field of ionizing radiation cure of polymerizable materials and to coatings of same and especially relates to a promoter to reduce the ionizing radiation level or dosage necessary to effect a cure of said materials.

From a commercial standpoint, radiation curing offers a number of advantages over thermal catalyst-initiated cures: immediate initiation of polymerization, extended pot life of the curable materials, little temperature rise so heat sensitive substrates may be employed in coatings, better control of the polymerization reaction, superior substrate-coating bonds are produced and much higher concentrations of radicals may be produced instantaneously. However, these advantages are difficult to realize if the curable materials require high curing doses of ionizing radiation since the economics become prohibitive. Commercialization then depends on reducing the cost of the curing process by finding methods and materials to effect a cure at lower dosages.

The search for means to accelerate or promote radiation curing is evident by a number of patents relating to certain polymerizable materials. While neither the promoters employed or the polymerizable materials correspond in any way to this invention, patents representative of such efforts include U.S. 3,202,513; 3,251,759; 3,265,604; 3,352,771 and 2,979,446. Commercially, it is desirable to be able to cure at dosages of no more than 2 to 3 megarads but it would be of great advantage to be able to cure at 1 megarad or even less.

SUMMARY OF THE INVENTION

Carbon tetrabromide has been unexpectedly found to be an effective promoter or accelerator for curing certain polymerizable materials in an inert atmosphere by ionizing radiation when employed in amounts of at least about 0.1 weight percent based on the weight of the polymerizable materials. Radiation curing dosages of less than 1 megarad can consistently be obtained by this invention.

The polymerizable material comprises a mixture of a nonvolatile vinyl monomer having no aromatic group directly attached to the vinyl group and a polymerizable vinyl ester resin prepared by reacting essentially equivalent amounts of an unsaturated monocarboxylic acid with a polyepoxide having more than one epoxide group per molecule.

DESCRIPTION OF THE INVENTION

Vinyl ester resins are a newer class of thermosettable resins which may be generally defined as a reaction product of an unsaturated monocarboxylic acid with a polyepoxide resin having more than one epoxide or oxirane group per molecule. The reactants are usually combined in about equivalent proportions of acid to epoxide groups, whereby the reaction of said acid with said epoxide produces a terminal polymerizable group connected to the polymer chain by

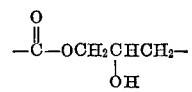

linkages. A vinyl ester resin prepared by reacting about equivalent amounts of acrylic acid with a diglycidyl ether of bisphenol A may be illustrated by the following general formula

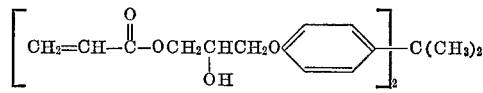

In place of acrylic acid one may substitute methacrylic acid or a half ester of a dibasic acid and a hydroxy alkyl acrylate, for example the hydroxyethyl acrylate half ester of maleic acid,

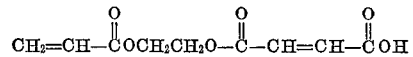

Such resins which are herein called vinyl ester resins are described in U.S. 3,367,992 where the unsaturated monocarboxylic acid is a 2-hydroxyalkyl acrylate or methacrylate half ester of a dicarboxylic acid; in U.S. 3,066,112; in U.S. 3,179,623; in U.S. 3,256,226 where the molecular weight of the polyepoxide is increased by reaction of same with a dicarboxylic acid; in U.S. 3,301,743; in U.S. 3,377,406 and elsewhere.

As shown in the above references a variety of polyepoxide resins or mixtures thereof may be used in the preparation of vinyl ester resins. Preferred polyepoxides are the polyglycidyl ethers of polyhydric phenols and polyhdric alcohols, the epoxy novolac resins and mixtures thereof wherein the epoxide equivalent weight may vary from about 150 up to about 6000. Said polyepoxides are made by reacting at least about two moles of an epihalohydrin with one mole of a polyhydric phenol, polyhydric alcohol or novolac resin and a sufficient amount of an alkali to combine with the halogen of the halohydrin. The products are characterized in having more than one epoxide group per molecule.

Unsaturated monocarboxylic acids useful in preparing vinyl ester resins include acrylic acid, methacrylic acid, halogenated acrylic or methacrylic acids, cinnamic acid, and the like and mixtures thereof. Also included are the 2-hydroxyalkyl acrylate or methacrylate half esters of dicarboxylic acids as described in U.S. 3,367,992 wherein the hydroxyalkyl group preferably has from 2 to 6 carbon atoms. Typical half esters include the 2-hydroxyetyl acrylate half ester of maleic acid, the 2-hydroxypropyl methacrylate half ester of phthalic acid and the like. Either saturated or unsaturated dicarboxylic acid half esters may be used. Conveniently the half esters are prepared by reacting about one mole of said hydroxyalkyl acrylate or methacrylate with one mole of a dicarboxylic acid anhydride. Further preparative details may be found in U.S. 3,367,992.

Various catalysts may be used in the preparation of vinyl ester resins. Catalysts include tertiary amines such as tris(dimethylaminomethyl)phenol, onium catalysts, triphenyl stibine and triphenyl phosphine and the like. Usually hydroquinone or other like polymerization inhibitors are added to prevent polymerization during the preparation of the resin.

According to this invention, the polymerizable materials comprise a mixture of said vinyl ester resin with a copolymerizable vinyl monomer which is nonvolatile and which is devoid of any aromatic groups directly attached to the vinyl group. Typical of such monomers which are excluded from this invention are styrene, vinyl toluene, vinyl naphthalene and similar monomers having the general formula $R_1R_2C=CH_2$ where either $R_1$ or $R_2$ is an aromatic group such as phenyl.

A variety of monomers may be employed with this invention provided the monomers are essentially nonvolatile. By this it is meant to exclude monomers which are predominantly gases at ambient temperatures. It is obvious that if the monomer is too volatile a substantial portion of the monomer would evaporate from a film or coating before the mixture of monomer and resin could be cured. Monomers which are normally liquid at room temperature may be used even though there may be a small loss of monomer by evaporation. It is possible to operate the process of this invention under higher pressures than atmospheric pressure to minimize any loss of said normally liquid monomers.

Useful monomers meeting the above requirements include both mono- and polyunsaturated monomers. Polymerizable monounsaturated monomers include unsaturated carboxylic acids such as acrylic and methacrylic acid; vinyl esters such as vinyl acetate, vinyl butyrate, vinyl benzoate and the like; vinyl ethers such as vinyl methyl ether and the like; acrylonitrile; alkyl and hydroxy alkyl esters of unsaturated carboxylic acids such as methyl acrylate, butyl acrylate, methyl ester of cinnamic acid, cyclohexyl methacrylate, hydroxyethyl methacrylate, hydroxypropyl acrylate, hydroxybutyl acrylate and the like; vinyl amide monomers such as acrylamide, diacetone acrylamide and the like; or mixtures thereof.

A variety of polyunsaturated polymerizable monomers within the above classes may be used including ethylene glycol dimethacrylate, trimethylol propane trimethacrylate, methylene bisacrylamide and other similar monomers.

The polymerizable materials of this invention are especially useful in coating various substrates such as metal, wood and the like either as a primer coating and/or a finished coating. In order to obtain the benefits of this invention at least 0.1 weight percent of carbon tetrabromide is added to the polymerizable materials. While quite large amounts of carbon tetrabromide may be added, there is no advantage in doing so. Preferably the amount ranges from about 0.5 to 15 weight percent and most preferably from about 2 to 5 weight percent.

When employed as coating formulations, other additives may be incorporated into the coating, for example, various inert fillers and pigments such as kaolin clay, titanium dioxide, silica, various inorganic oxides and the like. Films cast from the coating formulations may be rapidly cured by exposing them in an inert atmosphere to ionizing radiation (accelerated particulate radiation). A beam intensity of at least 50 microamperes is usually employed, but this invention is not limited thereto and lower beam intensities may be employed.

Generally, the films or coatings will range in thickness from about 0.1 mil up to about 10 mils. However, depending on the accelerating voltage thicknesses up to 250 mils or higher are feasible. The radiation curing step should be performed in an inert atmosphere. By this it is meant an atmosphere which is essentially free of oxygen since the presence of oxygen may result in an undesirable tacky surface. It is sufficient for this purpose to place a thin film of a plastic material such as a polyester (Mylar) film on the cast film or coating. Other means may be used such as curing in a chamber containing an essentially oxygen free atmosphere such as nitrogen, helium, argon and the like.

Accelerated particulate radiation includes particles such as electrons, protons, deuterons, other ions and the like. However, from an industrial standpoint, the cost and availability of machines limit the radiation curing to accelerated electrons for the immediate future. A variety of devices are available to provide accelerated electron radiation or varying voltages and beam intensities. Typical of such devices is the familiar Van de Graaff accelerator. Similar commercial accelerators utilizing various acceleration means are available from Texas Nuclear Corporation (cascade rectified system), High Voltage Engineering (insulated core transformer system), General Electric (a resonant transformer design) and Radiation Dynamics, Inc. (radio frequency cascade rectifier system).

The following nonlimiting examples will further illustrate the invention. All parts and percentages are by weight unless otherwise specified.

Example 1

A vinyl ester resin was prepared by reacting 2-hydroxyethyl acrylate with maleic anhydride to form a half ester and the half ester was then reacted with a glycidyl polyether of bisphenol A having an epoxide equivalent weight of 186–192 (D.E.R. 331) according to U.S. 3,367,992. The weight proportions of reactants was as follows:

|  | Percent |
|---|---|
| 2-hydroxyethyl acrylate | 30.5 |
| Maleic anhydride | 25.0 |
| D.E.R. 331 | 44.5 |

The vinyl ester resin was then employed in a series of tests which are further described below.

The vinyl ester resin was then mixed with n-butyl acrylate in the proportions of 60/40 and to this resin was then added 3% of various organic bromine compounds, based on weight of resin and monomer. A film was cast with a 7 mil draw-down bar on a Q-panel (4" x 12" x .03") and covered with a 2 mil sheet of Mylar (polyester) film to exclude air. The coated polished steel Q-panel was then passed through a 2 m.e.v. electron beam from a Van de Graaff accelerator filtered with 0.33 gm./cm.$^2$ Al. A 50 microampere beam current and a conveyor speed of 3.4 cm./sec. delivered a dose of 0.1 Megarad (Mrad) for each pass through the beam. The results are shown below:

| Additive: | Mrad dose to cure |
|---|---|
| None | 1.4 |
| CBr$_4$ | 0.5 |
| CHBr$_3$ | 1.2 |
| Acetylene tetrabromide | 1.2 |
| Tetrabromo bisphenol A | 1.6 |
| Methylene bromide | 1.4 |
| Ethylene dibromide | 1.4 |
| Bromochloromethane | 1.4 |
| Bromobenzene | 1.6 |
| CBr$_4$ (repeat experiment) | 0.5 |

The uniqueness of carbon tetrabromide in reducing the curing dose is evident from the above results.

Example 2

Using the same resin and test procedures of Example 1, the level of $CBr_4$ was evaluated with the following results.

| Amount of $CBr_4$ (percent): | Mrad dose to cure |
|---|---|
| None | 1.4 |
| 0.1 | 1.0 |
| 0.2 | 0.9 |
| 4.3 | 0.7–0.8 |
| 0.5 | 0.7 |
| 1 | 0.7 |
| 2 | 0.6 |
| 3 | 0.5 |
| 5 | 0.6 |
| 7 | 0.7 |
| 10 | 0.7 |
| 15 | 0.8 |

As little as 0.1% is effective in reducing the cure dose with a minimum at about the 2 to 5% level.

Example 3

The resin of Example 1 was further evaluated with a different monomer in place of n-butyl acrylate. The tests were performed in the previous manner.

| Monomer | Resin/monomer ratio | Percent $CBr_4$ | Mrad cure |
|---|---|---|---|
| 2-hydroxyethyl acrylate | 50/50 | None | 0.5 |
| Do | 50/50 | 3 | 0.3 |
| Cellosolve acrylate | 60/40 | None | 1.0 |
| Do | 60/40 | 3 | 0.4 |
| Hydroxybutyl acrylate | 50/50 | None | 0.5 |
| Do | 50/50 | 3 | 0.3 |
| Hydroxypropyl acrylate | 50/50 | None | 0.5 |
| Do | 50/50 | 3 | 0.3 |

The effectiveness of $CBr_4$ is evident even when various hydroxyalkyl acrylate monomers, which are known to be more sensitive to cure by ionizing radiation, are employed.

Example 4

A vinyl ester resin was made by reacting methacrylic acid (31%) with D.E.R. 331 (69%). The resin was then mixed with different monomers and cured according to the procedure of Example 1.

| Monomer | Resin/monomer ratio | Percent $CBr_4$ | Mrad cure |
|---|---|---|---|
| n-Butyl acrylate | 60/40 | None | 0.8 |
| Do | 60/40 | 3 | 0.5–0.6 |
| Hydroxyethyl acrylate | 50/50 | None | 0.3 |
| Do | 50/50 | 3 | 0.2 |

Example 5

In a manner similar to Example 1, a vinyl ester resin was prepared by first reacting 2-hydroxyethyl acrylate with maleic anhydride to prepare a half ester and then reacting the half ester in essentially equivalent amounts with a diglycidyl ether of neopentyl glycol. The resin was then mixed with n-butyl acrylate (75/25) and tested as before. With no $CBr_4$ a dose of 0.8 Mrad was required to cure the coating. But with 3% $CBr_4$ the dosage was reduced to 0.5–0.6 Mrad.

Example 6

Another resin was prepared similar to Example 1 wherein the half ester was prepared from 2-hydroxyethyl acrylate (25.55%) and phthalic anhydride (32.6%) and then reacting the half ester with D.E.R. 331 (41.85%). The resulting resin was mixed with n-butyl acrylate (60/40) and tested as before. With no $CBr_4$ the dose to cure was 1.6 Mrads but with 3% $CBr_4$ the dosage was reduced to 0.5–0.6 Mrad.

Example 7

A vinyl ester resin was prepared by reacting methacrylic acid (32.03%) with a mixture of polyepoxides, D.E.R. 331 (17.7%) and an epoxy novolac resin having an epoxide equivalent weight of 175–182 (50.27% of D.E.N. 438). The resin was mixed with two different monomers and tested as before.

| Monomer | Resin/monomer ratio | Percent $CBr_4$ | Mrad cure |
|---|---|---|---|
| n-Butyl acrylate | 60/40 | None | 0.6 |
| Do | 60/40 | 3 | 0.4 |
| 2-hydroxyethyl acrylate | 60/40 | None | 0.3 |
| Do | 60/40 | 3 | 0.2 |

As can be seen from the examples presented above, carbon tetrabromide is unique in reducing the curing dosage and maintains this unique property even when the particular polymerizable materials require a low dose level without the additive. Reductions in dosage even at these low levels represent a significant economic advantage.

What is claimed is:

1. In a process for curing a mixture of a nonvolatile vinyl monomer devoid of aromatic groups directly attached to said vinyl group and a polymerizable vinyl ester resin prepared by reacting essentially equivalent amounts of an unsaturated monocarboxylic acid with a polyepoxide resin having more than one epoxide group per molecule by exposing said mixture to ionizing radiation in an inert atmosphere the improvement which comprises curing said mixture in the presence of at least about 0.1 weight percent of carbon tetrabromide.

2. The process of claim 1 wherein said carbon tetrabromide is present in about 0.5 to 15 weight percent.

3. The process of claim 1 wherein said carbon tetrabromide is present in about 2 to 5 weight percent.

4. The process of claim 1 wherein said polyepoxide is a glycidyl polyether of a polyhydric phenol.

5. The process of claim 4 wherein said acid is acrylic acid or methacrylic acid.

6. The process of claim 4 wherein said acid is a half ester of a hydroxyalkyl acrylate or methacrylate and an unsaturated dicarboxylic acid wherein such alkyl group contains from 2 to about 6 carbon atoms.

7. The process of claim 1 wherein said polyepoxide is a glycidyl polyether of a polyhydric alcohol.

8. The process of claim 7 wherein said acid is acrylic or methacrylic acid.

9. The process of claim 7 wherein said acid is a half ester of a hydroxyalkyl acrylate or methacrylate and an unsaturated dicarboxylic acid wherein said alkyl group contains from 2 to about 6 carbon atoms.

10. A thermosettable mixture suitable for curing by exposure to low levels of ionizing radiation comprising a mixture of a nonvolatile vinyl monomer devoid of aromatic groups directly attached to said vinyl group and a polymerizable vinyl ester resin prepared by reacting essentially equivalent amounts of an unsaturated monocarboxylic acid with a polyepoxide having more than one epoxide group per molecule and at least about 0.1 weight percent based on the weight of the mixture of carbon tetrabromide.

11. The composition of claim 10 wherein said carbon tetrabromide is present in about 0.5 to 15 weight percent.

12. The composition of claim 10 wherein said carbon tetrabromide is present in about 2 to 5 weight percent.

13. The composition of claim 10 wherein said polyepoxide is a glycidyl polyether of a polyhydric phenol.

14. The composition of claim 13 wherein said acid is acrylic acid or methacrylic acid.

15. The composition of claim 13 wherein said acid is a half ester of a hydroxyalkyl acrylate or methacrylate and an unsaturated dicarboxylic acid wherein such alkyl group contains from 2 to about 6 carbon atoms.

16. The composition of claim 10 wherein said polyepoxide is a glycidyl polyether of a polyhydric alcohol.

17. The composition of claim 16 wherein said acid is acrylic acid or methacrylic acid.

18. The composition of claim 16 wherein said acid is a half ester of a hydroxyalkyl acrylate or methacrylate and an unsaturated dicarboxylic acid wherein said alkyl group contains from 2 to about 6 carbon atoms.

References Cited

UNITED STATES PATENTS

| | | | |
|---|---|---|---|
| 3,586,526 | 6/1971 | Aronoff | 260—836 |
| 3,586,530 | 6/1971 | Aronoff | 260—836 |
| 3,535,403 | 10/1970 | Holub | 260—837 |
| 3,515,552 | 6/1970 | Smith | 96—35.1 |
| 3,147,117 | 9/1964 | Wainer | 96—48 |
| 3,450,613 | 6/1969 | Steinberg | 260—837 |
| 3,495,987 | 2/1970 | Moore | 96—115 P |

PAUL LIEBERMAN, Primary Examiner

U.S. Cl. X.R.

117—93.31; 204—159.23; 260—37 Ep, 41A, 41B, 836, 837